US009905262B2

(12) United States Patent
Cottinet et al.

(10) Patent No.: US 9,905,262 B2
(45) Date of Patent: Feb. 27, 2018

(54) METHOD FOR TRANSMITTING AND/OR RECEIVING AUDIO SIGNALS

(71) Applicants: STMicroelectronics (Rousset) SAS, Rousset (FR); STMicroelectronics (Alps) SAS, Grenoble (FR)

(72) Inventors: Jonathan Cottinet, Bourgoin Jallieu (FR); Jean Claude Bini, Vence (FR)

(73) Assignees: STMICROELECTRONICS (ALPS) SAS, Grenoble (FR); STMICROELECTRONICS (ROUSSET) SAS, Rousset (FR)

(*) Notice: Subject to any disclaimer, the term of this patent is extended or adjusted under 35 U.S.C. 154(b) by 175 days.

(21) Appl. No.: 14/918,614

(22) Filed: Oct. 21, 2015

(65) Prior Publication Data
US 2016/0232938 A1    Aug. 11, 2016

(30) Foreign Application Priority Data

Feb. 6, 2015 (FR) .................................. 15 50952

(51) Int. Cl.
*G06F 17/00* (2006.01)
*G11B 20/10* (2006.01)
*G06F 3/16* (2006.01)
*H04L 7/04* (2006.01)
*H04B 15/04* (2006.01)

(52) U.S. Cl.
CPC ........ *G11B 20/10222* (2013.01); *G06F 3/165* (2013.01); *H04B 15/04* (2013.01); *H04L 7/04* (2013.01); *H04B 2215/065* (2013.01)

(58) Field of Classification Search
CPC ... G06F 3/165; G11B 20/10222; H04B 15/04; H04B 2215/065; H04L 7/04
See application file for complete search history.

(56) References Cited

U.S. PATENT DOCUMENTS

| 2004/0203396 | A1 | 10/2004 | Black et al. | |
|---|---|---|---|---|
| 2008/0119140 | A1 | 5/2008 | Maligeorgos et al. | |
| 2009/0138745 | A1* | 5/2009 | Dorsey | H04B 15/02 713/501 |
| 2014/0197875 | A1* | 7/2014 | Potty | G06F 1/04 327/360 |
| 2016/0087732 | A1* | 3/2016 | Wietfeldt | H04B 15/02 455/63.1 |

FOREIGN PATENT DOCUMENTS

EP    2355380 A1    8/2011

* cited by examiner

*Primary Examiner* — Joseph Saunders, Jr.
(74) *Attorney, Agent, or Firm* — Slater Matsil, LLP

(57) ABSTRACT

A method for transmitting and/or receiving a potential aggressor audio signal includes a transmission and/or a reception of successive groups of data timed by a first clock signal within respective successive frames synchronized by a second clock signal. In the presence of a risk of interference of the potential aggressor audio signal with a different, potential victim, signal, during the transmission or reception of the potential aggressor audio signal, the frequency of the first clock signal is modified while keeping the frequency of the second clock signal unchanged.

19 Claims, 2 Drawing Sheets

METHOD FOR TRANSMITTING AND/OR RECEIVING AUDIO SIGNALS

This application claims the priority to French Application No. 1550952, filed on Feb. 6, 2015, which application is hereby incorporated herein by reference.

TECHNICAL FIELD

Embodiments of the invention relate to the transmission of an audio signal and, in particular embodiments, include a frequency evasion mechanism of the transmission clock.

BACKGROUND

In a cellular mobile telephone or wireless communication device including a plurality of reception/transmission circuits, the digital interfaces normally generate interference which adversely affects the radiofrequency transmitters and which causes a degradation in the received signals and therefore a degradation in the receive performance. These digital interfaces are regarded as "aggressors."

The digital audio signal transmitters/receivers generate interference, notably due to electromagnetic leakage. FM radio receivers are very sensitive to this electromagnetic leakage because, inter alia, FM radios operate at quite low frequencies, notably between 65 and 108 MHz.

FM radio receivers are not the only "victims." In fact, 2G and 3G transmitters and/or receivers are also potential victims, as is the GPS (Global Positioning System) network, but also phase locked loops, denoted PLL, amplifiers, analog/digital or digital/analog converters, etc.

More generally, any electronic device containing sensitive analog parts may fall victim to interference.

The 2G or 3G bands are higher. The minimum lower limit of these bands has a frequency of 450 MHz. Consequently, interference should not be as great. However, this interference may nevertheless cause serious problems for signal reception.

Moreover, digital audio interfaces may be considered as aggressors for some electronic devices which are then considered as potential victims.

SUMMARY

Embodiments of the invention relate to the transmission of an audio signal and, more particularly, the reduction in the interference generated by the potential "aggressor" audio signal on other signals transmitted or received by neighboring transmitters/receivers which are regarded as "victims."

Different approaches exist for reducing this interference.

A first approach consists in acting directly on the routing of the tracks on the printed circuits, notably by distancing to the maximum the tracks of the potential victims in order to reduce electromagnetic interactions and capacitive coupling. The major disadvantage of this approach is the surface cost and the complexity brought about or added to an already fundamentally complex task. Some printed circuits have limited dimensions and a high number of tracks which limits the possibilities of such an approach.

A second approach, referred to as "slew-rate control" or "slew-rate limitation", consists in using electronic circuitry in order to modify the initial, segmented shape of the digital audio signal and notably apply a slope to the rising and falling edges of the signal. This approach enables the interference to be reduced, but without ever eliminating it. Given the modification made to the shape of the signal, the reduction in the interference is implemented to the detriment of the integrity of the signal or sampling speed in the case where the integrity of the signal needs to be preserved. The "slew-rate limitation" technique does not work well for victims sensitive to low frequencies.

According to one embodiment, a third approach, different from the other two presented approaches, enables the interference to be reduced or even eliminated by acting directly on the frequency of an "aggressor" digital audio signal without affecting the perception thereof.

According to one aspect, a method for transmitting and receiving a potential aggressor audio signal is proposed, the method comprising a transmission and/or a reception of successive groups of digital audio data timed by a first clock signal within respective successive frames synchronized by a second clock signal, typically corresponding to the rhythm of the frame ("frame synchronization").

According to one general characteristic of this aspect, in the presence of a risk of interference of the potential aggressor audio signal with a different, potential victim, signal, during the transmission or reception of the potential aggressor audio signal, the frequency of the first clock signal is modified while keeping the frequency of the second clock signal unchanged.

The modification (increase or decrease) of the frequency of the first clock signal which corresponds to the data transmission frequency of the audio signal enables the implementation of a frequency offset of the audio signal in relation to the frequency band to which the victim is sensitive and therefore the separation into two distinct frequencies of the elements of each signal, thus eliminating any interference.

The modification of the frequency of the first clock signal can be likened to a transmission clock frequency hopping mechanism.

The maintenance of the frequency of the second clock signal corresponding to the reading or writing frequency of the potential aggressor audio signal enables the avoidance of any modification of the sound heard by the user of the potential aggressor audio signal. In fact, a modification of the audio reading frequency would modify the auditory perception of the audio signal by a sound being lower or higher and therefore altered. In more extreme cases, clips or pops may be observed, since the device transforming the electric signal into an acoustic signal will receive too many or not enough samples.

The method applies as much to a "master" audio transmitter as to a "master" audio receiver, the "master" component (transmitter or receiver) fixing the transmission/reception frequencies of the "slave" component (receiver or transmitter.

In fact, the "master" electronic component modifies the frequency of its first clock signal and the "slave" electronic component, given that it operates with the same clocks as the "master" electronic, then operates with the modified frequency.

Given the non-modification of the frame synchronization frequency, this method complies with the I²S electrical interface standard, also referred to as "Integrated Interchip Sound." The I²S standard is a serial bus electrical interface standard for connecting digital audio devices together. More generally, this method is also well suited to multichannel audio protocols, such as TDM (Time Division Multiplexing).

Advantageously, the method may include an evaluation of the interference risk of the potential aggressor audio signal with the other, potential victim, signal having a carrier frequency, the evaluation including a comparison of the harmonics of the frequency of the first clock with the frequency plan to be preserved.

The evaluation allows the appearance of interference on the other, potential victim, signals to be anticipated. The evaluation is carried out on the basis of the frequencies used by the different "victim" transmitters/receivers and on the basis of the frequencies used by the different "aggressor" transmitters/receivers.

The group of data is preferably transmitted within each frame within a processing time window having a length less than or equal to the period of the second clock.

The definition of a processing time window within a period of the second clock enables the synchronization with each new frame of the audio data to be transmitted with the corresponding frame.

The time window may advantageously begin on the active edge of the signal of the first clock preceding the active edge of the signal of the second clock, the data of the group of data of the audio signal being transmitted from the active edge of the signal of the first clock simultaneously with the active edge of the signal of the second clock.

The starting of the time window within a period of the first clock before the active edge of the second clock ensures the correct synchronization of the first and second clocks, regardless of the type of transmitter/receiver, notably when the frequency of the first clock has been modified between two activities of the signal of the second clock.

The signal of the first clock and the signal of the second clock can advantageously be constructed from the signal of the same main clock, the signal of the first clock resulting from a first division of the signal of the main clock and the signal of the second clock resulting from a second division of the signal of the main clock.

This configuration allows the frequency of the signal of the first clock to be modified independently from the frequency of the signal of the second clock.

Alternatively, the signal of the first clock and the signal of the second clock can be constructed from the signal of the same main clock, the signal of the first clock resulting from a division of the signal of the main clock, and the signal of the second clock resulting from a division of the signal of the first clock.

In this configuration, when the frequency of the signal of the first clock is modified, the second divider is modified in such a way as to keep the frequency of the signal of the second clock unchanged. The frequency of the signal of the first clock is therefore chosen from multiples of the frequency of the signal of the second clock.

According to a different aspect, a system is proposed for transmitting and receiving a potential aggressor audio signal including a first clock suitable for timing at a first frequency the transmission and/or reception of successive groups of data within respective successive frames and a second clock suitable for timing the frames at a second frequency.

According to a general characteristic of this aspect, the system includes a controller configured in such a way that, in the presence of a risk of interference of the potential aggressor audio signal with a victim device processing a different, potential victim, signal, they modify the frequency of the first clock signal by keeping the frequency of the second clock signal unchanged.

The system may advantageously include an evaluation circuit configured to evaluate the risk of interference of the potential aggressor audio signal with the other, potential victim, signal having a carrier frequency, the evaluation circuit including a comparator suitable for comparing the harmonics of the frequency of the first clock with the carrier frequency of the other, potential victim, signal.

The system may advantageously include a main clock, a first frequency divider connected to the output of the main clock and suitable for delivering the signal of the first clock, and a second frequency divider connected to the output of the main clock and suitable for delivering the signal of the second clock.

Alternatively, the system may include a main clock, a frequency divider connected to the output of the main clock and suitable for delivering the signal of the first clock on a first output, and a frequency divider connected to a second output of the first clock and suitable for delivering the signal of the first clock.

According to a further different aspect, a communication device, in particular a cellular mobile telephone, is proposed, incorporating a system as defined above.

BRIEF DESCRIPTION OF THE DRAWINGS

Other advantages and characteristics of the invention will become evident from the detailed description of an embodiment of the invention, which is in no way limiting, and the attached drawings, in which.

DETAILED DESCRIPTION OF ILLUSTRATIVE EMBODIMENTS

Figure 1:
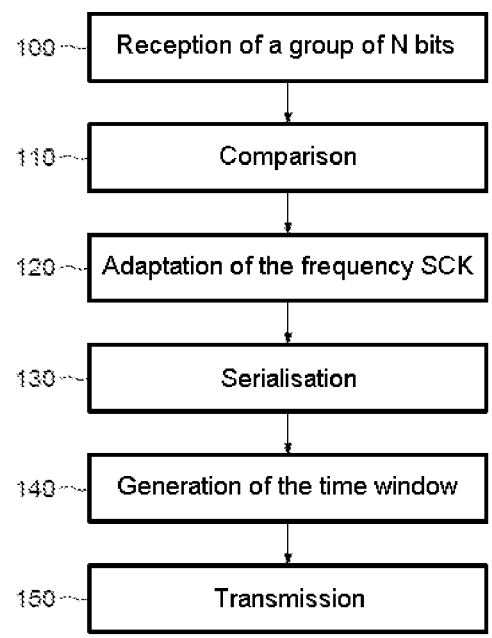
FIG. 1 shows a flow diagram of a transmission method according to one embodiment of the invention.

FIG. 1 shows a flow diagram of a method for transmitting a potential aggressor audio signal according to one embodiment of the invention, the transmission being considered here as the "master" element.

In a first step 100 of the transmission method, a group of N audio data bits is received. A group of N audio data bits is received by a processing unit with each new period of a signal of a synchronization clock 4, the frequency of which corresponds to the frequency of the frame, i.e. the frequency at which the audio data are subsequently read.

Instead of receiving a single group of N bits, the method could include a reception of a plurality of groups simultaneously, the groups including a variable number of bits.

The potential aggressor audio signal is transformed in order to transmit the audio data. Each group of N bits is transformed into a succession of N bits. In fact, the N audio data bits of a group are received in parallel and are serialized before their transmission. The N bits of a group are serialized at a transmission frequency SCK higher than the synchronization frequency SYNC. The transmission frequency SCK is chosen in such a way as to transmit all of the N bits of at least one group within the same period, i.e. the same frame, of the synchronization clock signal.

Before performing the serialization (serialisation), a comparison is carried out, in a step 110, of the harmonics of the transmission frequency SCK provided to transmit the N bits of the frame at the working frequencies of the transmitter/receivers likely to be victims included in the electronic device in which the transmission system carrying out the method is installed.

If harmonics of the transmission frequency SCK correspond to the working frequency of one of the other transmitters/receivers of the potential victim device, the transmission frequency SCK of the data is modified in a step 120. The frequency is modified by changing the frequency in relation to the minimum necessary frequency.

The minimum necessary frequency corresponds to the minimum frequency enabling the transmission of the N audio data bits of a group in a frame, i.e., in a period, of the signal of the synchronization clock 4.

The data transmission frequency SCK is thus chosen so that none of its harmonics, or as few harmonics as possible, correspond to one of the working frequencies of the victim devices.

Once the transmission frequency SCK has been selected, the data of the group are transformed in a step 130. The N data are thus serialized initially in parallel in such a way as to obtain a series of N bits timed at the transmission frequency SCK thus selected.

A processing time window F is generated in a following step 140. The processing time window F is generated on the active edge of the period of the signal of the transmission clock 3 preceding the active edge of the signal of the synchronization clock 4.

The frequency change of the signal of the transmission clock 3 is implemented on the active edge of the signal of the synchronization clock 4. Also, in the case where the transmission frequency SCK is modified between two frames of the signal of the synchronization clock 4, the first period of the signal of the transmission clock 3 in the time window F, i.e., the period of the signal of the transmission clock 3 preceding the active edge of the synchronization clock 4, is different from the value of the following periods.

The audio data of a group are transmitted within this time window F and within a frame of the signal of the synchronization clock 4. Consequently, during the first period of the signal of the transmission clock 3 in the time window F, no datum of the group is transmitted.

This time lag in the starting of the transmission window ensures the correct synchronization of the transmission clock 3 with the synchronization clock 4, regardless of the transmitter that is used.

Finally, in a step 150, the series of N audio data bits of a group is transmitted at a transmission frequency SCK within the frame of the signal of the synchronization clock 4, and within the time window F.

Figure 2:
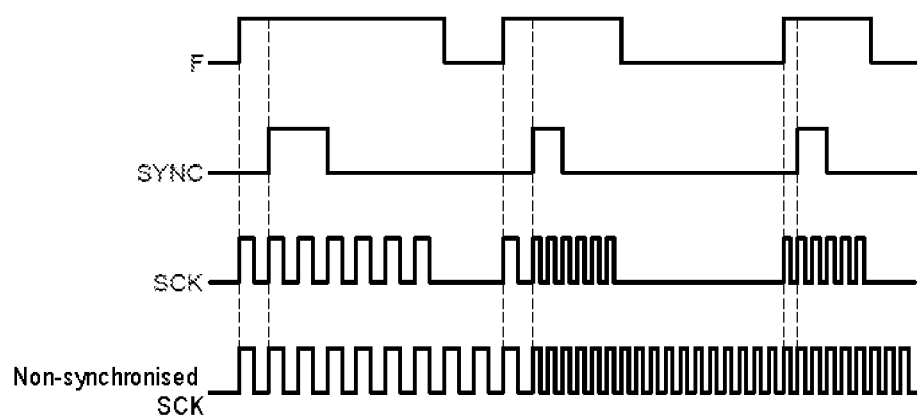
FIG. 2 shows a graphical representation of signals transmitted with and without modification of the frequency of the first clock signal of the method shown in FIG. 1.

As illustrated in FIG. 2, which shows a graphical representation of the signals of the two clocks SCK and SYNC of the time window F, the time window is closed before the end of the frame of the signal of the synchronization clock 4 and before the opening of a new time frame F.

Alternatively, it is possible to provide a closing of the preceding time window F coinciding with the opening of the following time window F.

Moreover, as can be seen, the opening of the time window F being synchronized with the signal SCK of the transmission clock 3, the time of opening of the time window F varies in relation to the signal SYNC of the synchronization clock 4.

In a different embodiment of the invention, the method can be applied to the reception of an audio signal, the reception being the "master" element.

In an embodiment of this type, the consequence of the modification of the frequency of the first clock signal by the receiver is that the "slave" transmitter will transmit the signal with the modified frequency of the first clock signal.

FIG. 2 also includes an example of a graphical representation (timing chart at the bottom of FIG. 2) of a signal SCK of the transmission clock 3 in the case where it would not be synchronized with the time window F.

Figure 3:
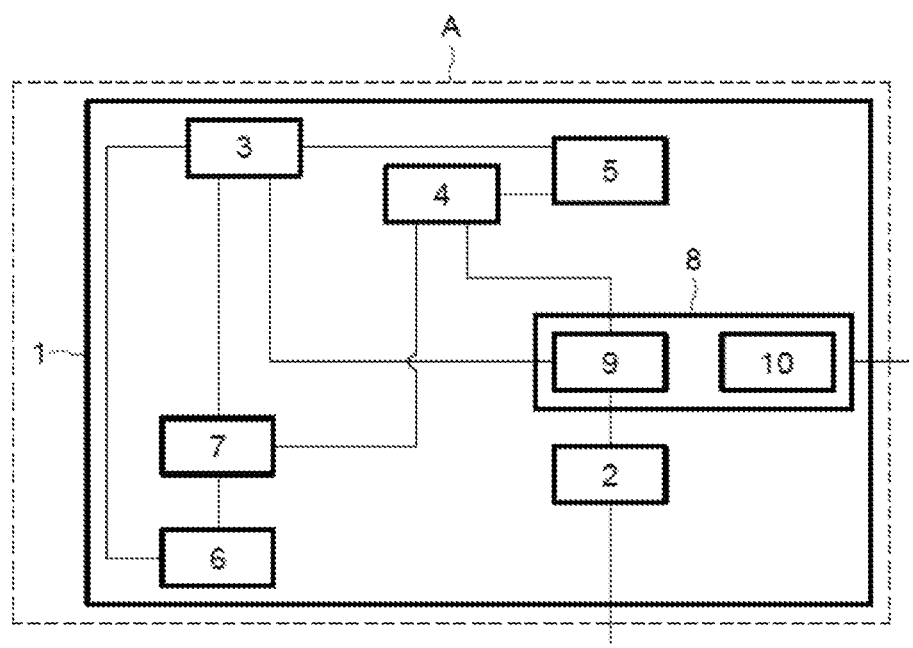
FIG. 3 shows schematically a system for transmitting an audio signal according to one embodiment of the invention.

FIG. 3 shows schematically a system for transmitting an audio signal according to one embodiment of the invention, suitable for carrying out the method shown in FIG. 1.

A system of this type can be incorporated within a communication device, for example, a cellular mobile telephone or a router, etc.

The transmission system 1 includes a number of circuits. An acquisition circuit 2 acquires an audio signal that comprises a succession of groups of audio data. A transmission clock 3 is suitable for timing at a transmission frequency SCK the transmission of successive groups of data within respective successive frames. A synchronization clock 4 is suitable for timing the frames at a synchronization frequency SYNC.

The signals of each clock are generated from the same signal of a main clock 5.

The transmission clock 3 includes a first divider suitable for applying a frequency division coefficient to the signal received at the input of the transmission clock 3 and originating from the main clock 5.

The synchronization clock 4 includes a second divider suitable for applying a frequency division coefficient to the signal received at the input of the synchronization clock 4 and originating from the main clock 5.

The system 1 furthermore includes evaluation circuit 6, which is configured to evaluate the interference risk of the potential aggressor audio signal with the victim device processing a different signal having a carrier frequency. The evaluation circuit 6 includes a comparator suitable for comparing the harmonics of the frequency SCK of the transmission clock 3 with the carrier frequency of the other signal.

The system 1 also includes controller 7 configured in such a way that, in the presence of a risk of interference of the audio signal with a victim device processing a different signal, the controller 7 modifies the frequency of the transmission clock signal 3 while keeping the frequency of the synchronization clock 4 unchanged.

In the case where the frequency of the signal of the transmission clock 3 is modified for the first time, the frequency will generally be increased. Conversely, in the case where this frequency has already been previously modified, it may be increased or reduced in order to reduce the risk of interference, provided that it is not lower than the minimum authorized frequency below which a malfunction occurs.

As indicated above, the minimum necessary frequency corresponds to the minimum frequency enabling the transmission of the N audio data bits of a group in a frame, i.e. in a period, of the signal of the synchronization clock 4.

The system 1 includes transmitter 8, connected to the transmission clock 3 and to the synchronization clock 4, and receiving at the input the groups of audio data bits delivered by the acquisition circuit 2.

The transmitter 8 include a data serialization module 9 suitable for transforming the groups of audio data in parallel and a series of data bits timed at the transmission frequency SCK of the transmission clock 3 in a frame of the signal of the synchronization clock 4.

The transmitter 8 furthermore include a module 10 for generating a processing time window F configured to generate a time window F in which the audio data must be transmitted.

The system and method for transmitting and/or receiving a potential aggressor audio signal enable a reduction or even elimination of the interference generated by electromagnetic leakage of the audio signal in an electronic device by acting directly on the transmission frequency of the audio signal, but without modifying the audio signal reading frequency.

What is claimed is:

1. A method for communicating, the method comprising:
   communicating successive groups of digital data timed at a first frequency by a first clock signal within respective successive frames synchronized at a second frequency by a second clock signal, the communicating comprising transmitting or receiving a potential aggressor signal; and
   modifying the first frequency while keeping the second frequency unchanged while communicating the potential aggressor signal, the modifying performed in the presence of a risk of interference of the potential aggressor signal with a potential victim signal, wherein a time window for transmitting the digital data begins on an active edge of the first clock signal that precedes an active edge of the second clock signal, the data of the groups of data being communicated from the active edge of the first clock signal simultaneously with the active edge of the second clock signal.

2. The method according to claim 1, wherein the digital data comprises digital audio data and wherein the potential aggressor signal comprises a potential aggressor audio signal.

3. The method according to claim 1, further comprising evaluating the risk of interference of the potential aggressor signal with the potential victim signal.

4. The method according to claim 3, wherein the evaluating comprises comparing harmonics of the first frequency with a frequency plan of potential victim devices likely to be affected by interference.

5. The method according to claim 1, wherein the communicating comprises transmitting the potential aggressor signal.

6. The method according to claim 1, wherein the communicating comprises receiving the potential aggressor signal.

7. The method according to claim 1, wherein the groups of data are communicated within each frame within a processing time frame that has a length less than or equal to a period of the second clock signal.

8. The method according to claim 1, wherein the first clock signal and the second clock signal are both generated from a main clock signal, the first clock signal resulting from a first division of the main clock signal and the second clock signal resulting from a second division of the main clock signal.

9. The method according to claim 1, wherein the first clock signal and the second clock signal are generated from a main clock signal, the first clock signal resulting from a first division of the main clock signal and the second clock signal resulting from a division of the first clock signal.

10. A system for transmitting and receiving signals, the system comprising:
    a first clock generator configured to generate a first clock signal that is suitable for timing communication of successive groups of data within respective successive frames at a first frequency;
    a second clock generator configured generate a second clock signal to time the frames at a second frequency; and
    a controller configured to modify the first frequency while the second frequency remains unchanged in the presence of a risk of interference with a potential victim signal during the communication, wherein the controller is further configured to generate a time window for transmitting the data that begins on an active edge of the first clock signal that precedes an active edge of the second clock signal, the data of the successive groups of data being communicated from the active edge of the first clock signal simultaneously with the active edge of the second clock signal.

11. The system according to claim 10, further comprising an evaluation circuit configured to evaluate the risk of interference with the potential victim signal.

12. The system according to claim 11, wherein the evaluation circuit comprises a comparator configured to compare harmonics of the first frequency of the first clock signal with a frequency plan of devices likely to be affected by interference.

13. The system according to claim 10, further comprising a main clock circuit;
    wherein the first clock generator comprises a first frequency divider with an input coupled to an output of the main clock circuit; and
    wherein the second clock generator comprises a second frequency divider with an input coupled to the output of the main clock circuit.

14. The system according to claim 10, further comprising a main clock circuit;
    wherein the first clock generator comprises a first frequency divider with an input coupled to an output of the main clock circuit; and
    wherein the second clock generator comprises a second frequency divider with an input coupled to an output of the first frequency divider.

15. A cellular mobile telephone comprising the system according to claim 10.

16. A system comprising:
    a main clock circuit configured to generate a main clock signal;
    a transmission clock circuit configured to generate a transmission clock signal based on the main clock signal;
    a synchronization clock circuit configured to generate a synchronization clock signal based on the main clock signal;
    a transmitter with a clock input coupled to receive the transmission clock signal, the transmitter configured to transmit a potential aggressor signal;
    an evaluation circuit configured to evaluate a risk of interference of the potential aggressor signal with a potential victim signal; and
    a controller configured to modify a frequency of the transmission clock signal in the presence of a risk of interference with the potential victim signal during transmission of the potential aggressor signal, wherein a frequency of the synchronization clock signal remains unchanged during transmission of the potential aggressor signal, and wherein the controller is configured to generate a time window for transmitting the potential aggressor signal, the time window beginning on an active edge of the transmission clock signal that precedes an active edge of the synchronization clock signal, the potential aggressor signal being communicated from the active edge of the transmission clock signal simultaneously with the active edge of the synchronization clock signal.

17. The system according to claim 16, wherein the evaluation circuit comprises a comparator configured to compare harmonics of the frequency of the transmission clock signal with a frequency plan of devices likely to be affected by interference.

18. The system according to claim 16, wherein the transmission clock circuit comprises a first frequency divider with an input coupled to an output of the main clock circuit, and wherein the synchronization clock circuit comprises a second frequency divider with an input coupled to the output of the main clock circuit.

19. The system according to claim 16, wherein the transmission clock circuit comprises a first frequency divider with an input coupled to an output of the main clock circuit, and wherein the synchronization clock circuit comprises a second frequency divider with an input coupled to an output of the first frequency divider.

* * * * *